(12) United States Patent
Louk et al.

(10) Patent No.: US 7,802,653 B2
(45) Date of Patent: Sep. 28, 2010

(54) ADJUSTABLE TREE STAND (76) Inventors: John M. Louk, 551 Macedonia Rd., Petal, MS (US) 39465; Ronald L. Berkbuegler, 8767 Old Lebanon/Troy Rd., Troy, IL (US) 62294

( * ) Notice: Subject to any disclaimer, the term of this patent is extended or adjusted under 35 U.S.C. 154(b) by 1070 days.

(21) Appl. No.: 11/332,129

(22) Filed: Jan. 13, 2006

(65) Prior Publication Data

US 2006/0169538 A1    Aug. 3, 2006

Related U.S. Application Data (60) Provisional application No. 60/643,880, filed on Jan. 14, 2005.

(51) Int. Cl.
*E04G 3/00* (2006.01)
(52) U.S. Cl. ................. 182/135; 182/187
(58) Field of Classification Search ............... 182/135, 182/136, 187, 188
See application file for complete search history.

(56) References Cited

U.S. PATENT DOCUMENTS

| | | | |
|---|---|---|---|
| 1,176,225 A | | 3/1916 | Lloyd |
| 3,067,975 A | | 12/1962 | Wilcox |
| 3,268,196 A | * | 8/1966 | Anton, Sr. .............. 182/107 |
| 3,485,320 A | | 12/1969 | Jones |
| 3,817,350 A | | 6/1974 | Gray |
| 3,885,649 A | | 5/1975 | Damron |
| 4,022,292 A | | 5/1977 | Van Gompel |
| 4,137,995 A | | 2/1979 | Fonte |
| 4,230,203 A | | 10/1980 | Sweat et al. |
| 4,230,296 A | | 10/1980 | Staley et al. |
| 4,244,445 A | * | 1/1981 | Strode .................. 182/136 |
| 4,316,526 A | | 2/1982 | Amacker |
| 4,321,982 A | | 3/1982 | Strickland |
| 4,331,216 A | | 5/1982 | Amacker |
| 4,347,690 A | * | 9/1982 | Wallace, Jr. ................ 52/93.1 |
| 4,417,645 A | | 11/1983 | Untz |

(Continued)

FOREIGN PATENT DOCUMENTS

CA    1140447    2/1983

(Continued)

OTHER PUBLICATIONS

Innovative Treestand Systems, Inc. pamphlet.

(Continued)

*Primary Examiner*—Alvin C Chin-Shue
(74) *Attorney, Agent, or Firm*—Peter L. Brewer; Baker, Donelson, Bearman, Caldwell & Berkowitz, PC (57) ABSTRACT

A tree stand is provided, having a frame. The tree stand may be a standing tree stand in which case the frame includes a platform on which a user may stand; alternatively, the tree stand may be a seating tree stand in which case the frame includes a seat on which a user may sit. The tree stand includes a cable dimensioned to be wrapped around a tree. The tree stand is configured so that tension in the cable may be adjusted while the tree stand supports the weight of the user. In one aspect, the tree stand employs a rotatable sleeve in one arm for adjusting the length of the cable by adjusting the tension in the cable.

11 Claims, 2 Drawing Sheets

Enlarged

U.S. PATENT DOCUMENTS

| | | | |
|---|---|---|---|
| 4,428,459 A | 1/1984 | Peck | |
| 4,452,338 A | 6/1984 | Untz | |
| 4,549,633 A | 10/1985 | Merritt | |
| 4,553,634 A | 11/1985 | Roberts et al. | |
| 4,648,483 A | 3/1987 | Skyba | |
| 4,667,773 A | 5/1987 | Davis | |
| 4,705,143 A | 11/1987 | Ziemba | |
| 4,722,421 A | 2/1988 | Hilbert | |
| 4,726,447 A | 2/1988 | Gibson et al. | |
| 4,776,503 A | 10/1988 | Sink | |
| 4,787,476 A | 11/1988 | Lee | |
| 4,890,694 A | 1/1990 | Williams | |
| 4,909,353 A | 3/1990 | Govin et al. | |
| 4,942,942 A | 7/1990 | Bradley | |
| 4,953,662 A | 9/1990 | Porter | |
| 4,987,972 A | 1/1991 | Helms | |
| 4,997,063 A | 3/1991 | Bradley | |
| 5,016,733 A | 5/1991 | Bradley | |
| 5,050,704 A | 9/1991 | Olsson | |
| 5,090,506 A | 2/1992 | Womack et al. | |
| 5,097,925 A | 3/1992 | Walker, Jr. | |
| 5,156,236 A | 10/1992 | Gardner et al. | |
| 5,234,076 A | 8/1993 | Louk et al. | |
| 5,265,780 A | 11/1993 | Matthews et al. | |
| D347,481 S | 5/1994 | Ashley et al. | |
| 5,316,104 A | 5/1994 | Amacker | |
| 5,433,291 A | 7/1995 | Shoestock, Sr. | |
| 5,458,215 A | 10/1995 | Burgin | |
| 5,564,524 A * | 10/1996 | Thaggard et al. | 182/116 |
| 5,641,036 A | 6/1997 | Maxwell | |
| 5,887,676 A | 3/1999 | Harbin | |
| 5,921,348 A | 7/1999 | Louk et al. | |
| 5,971,104 A | 10/1999 | Woller | |
| 5,996,738 A | 12/1999 | Nelsen | |
| 6,308,801 B1 | 10/2001 | Futch | |
| 6,595,325 B2 | 7/2003 | Ulrich | |
| 6,986,404 B1 * | 1/2006 | Laborde | 182/135 |
| 6,988,588 B2 * | 1/2006 | Prejean | 182/136 |
| 7,287,623 B2 * | 10/2007 | Graham, Sr. | 182/133 |
| 2003/0205431 A1 * | 11/2003 | Berkbuegler | 182/187 |
| 2005/0269157 A1 | 12/2005 | Boice et al. | |

FOREIGN PATENT DOCUMENTS

| | | |
|---|---|---|
| CA | 1231686 | 1/1988 |
| CA | 2048501 | 9/1994 |

OTHER PUBLICATIONS

Ol 'Man Treestands 2002 Catalog, L & L Enterprises, Inc.

* cited by examiner

Figure 1- Ol'Man Double X

Figure 2- Pivoting Arm Connection of Double X
(Shown with cover installed)

Figure 3- Figure 2 Enlarged

Figure 4- Pivoting Arm Connection of Double X
(Shown with cover removed)

Figure 5- Figure 4 Enlarged

Fig. 6

ADJUSTABLE TREE STAND

STATEMENT OF RELATED APPLICATIONS

The present application claims priority to Provisional Patent Application Ser. No. 60/643,880 filed Jan. 14, 2005. (Confirmation No. 4832.) That application is entitled "Adjustable Tree Stand," and is incorporated herein by reference in its entirety.

BACKGROUND OF THE INVENTION

1. Field of the Invention

The present invention pertains to a stand for supporting a person in a tree. More particularly, the present invention pertains to a tree stand having adjustable arms.

2. Description of the Related Art

Tree stands are known to those who desire to observe game in their natural habitat. A tree stand allows a person to elevate one's position off of the ground to a selected height. Tree stands are used by hunters, photographers and nature observers in order to take themselves out of the immediate line of sight and scent of animals on the ground.

Various designs for tree stands are described in the patent literature. Many of these stands employ a main frame for supporting the user, and a pair of arm members that are secured to a tree by a bracket or flexible cable. Two patents that issued in 1991 demonstrate tree stands having a pair of adjustable arms. The first is U.S. Pat. No. 4,995,475 which issued to R. Berkbuegler in February of 1991; the second is U.S. Pat. No. 4,997,063 which issued to R. Bradley in March of 1991. Each of these patents demonstrates a pair of pivoting support arms having adjustable lengths. In each patent, a rotatable sleeve serving as a turnbuckle is provided in order to selectively shorten or lengthen the respective arms. Each of these designs employs a ridged bracket rather than a flexible cable around the tree. In addition, each of these designs requires that adjustments to the arms be made substantially simultaneously in order to prevent the tree stand from becoming unlevel or "out of horizontal."

A year later, U.S. Pat. No. 5,090,506 issued to Womack, et al. in 1992. This patent is titled "Adjustable Hunter's Tree Stand." The tree stand of Womack, et al. uses a pair of threaded rods captured between corresponding opposed threaded lugs on each side of stand. Each rod has a threaded nut disposed thereon. Rotation of each threaded rod by a knob thereon results in an adjustment of the position of tree engaging blades. In this way, different tree diameters are accommodated. Womack, et al. thus requires adjustment of a threaded rod on each side of the stand in order to adjust the positioning and level of the stand uniformly.

U.S. Pat. No. 5,234,076 issued to Louk, et al. in 1993. This patent offered a flexible steel cable for conveniently wrapping around the tree. One end of the cable is fixedly secured to a first arm of the tree stand, while the opposite end is selectively secured to an adjustment arm by use of a key or ring inserted through a loop at the end of the cable. While this design does provide an improved method for positioning a tree stand within a tree, once the user is positioned on the tree stand, the position of the tree stand relative to the tree cannot be adjusted. Moreover, micro-adjustments to the length of the cable cannot be made.

U.S. Pat. No. 6,308,801 issued to Futch in 2001. This patent offers a tree stand design in which the relative position of the support cable along each of the opposing arms can be adjusted. One end is secured by use of a key inserted through a cable loop end and aligned frame holes, while the other end is selectively secured by means of a cable adjustment mechanism. Tightening and loosening the cable is accomplished by sliding the adjustment mechanism along a cable adjusting guide. However, the adjustment to the cable length must again be made when the user's weight is removed from the frame. This design further has certain limitations in terms of complexity and expense of manufacture incident to the moving parts, and may be too noisy for its purpose for discretely observing wild game in the woods.

Finally, U.S. Pat. No. 6,595,325 recently issued in 2003 to Ulrich. This tree stand design also employs a flexible cable to secure a frame to a tree. The opposing ends of the cables are attached to respective support arms of the tree stand frame. One end of the cable is attached to a "coarse adjustment" arm which involves a cable loop secured at a selected point along a first arm by a pin member. This is referred to as a "coarse adjustment." The other end is secured to the eye of an eye bolt, which in turn is moved by adjusting a knob. This is referred to as an "infinitesimally fine adjustment." Thus, the relative positions of the cable ends to the support arms are adjustable. However, the position of the arms relative to the frame is fixed, that is, the arms do not appear to pivot. This serves as a limitation to the flexibility of the tree stand. Further, the knob may be difficult for some users to manipulate and may even be too fine.

A need therefore remains for an improved tree stand design having adjustment arms. Further, a need exists for an improved tree stand design wherein one end of a flexible support cable is selectively connected to a pivoting macro-adjustment arm, while the other end of the cable is connected to an easily manipulated pivoting micro-adjustment arm. A need further exists for such a tree stand wherein fine-tuning of the cable tension can be accomplished while the tree stand supports the weight of the user. Further, a need exists in one aspect for a seated tree stand which better accommodates the girth of the user.

SUMMARY OF THE INVENTION

A tree stand is provided. In one aspect, the tree stand includes a main frame having a front portion and opposing first and second sides. The tree stand also includes a flexible tensile member such as a steel cable dimensioned to be wrapped around a tree, with the cable having first and second ends. The tree stand is configured so that tension in the cable may be adjusted while the tree stand supports the weight of the user. The tree stand may be a standing tree stand in which case the frame includes a platform on which a user may stand; alternatively, the tree stand may be a seating tree stand in which case the frame includes a seat supported by the first and second sides of the frame on which a user may sit.

In one embodiment, the tree stand has a micro-adjustment arm on the first side, and a macro-adjustment arm on the second side. Each arm receives an end of the cable. At a first end, the cable is fixedly connected to the micro-adjustment arm. The first end of the cable is operatively connected to a rotatable sleeve for fine-tuning the length of the micro-adjustment arm. The rotatable sleeve may have an ergonomically improved grip through a built up or shaped outer diameter. Preferably, at least a portion of the outer diameter exceeds two inches. At its second end, the cable is releasably connected to the macro-adjustment arm. The macro-adjustment arm receives the second end of the cable at variable points along its length. In one aspect, the macro-adjustment arm defines an arcuate, tubular body having a plurality of through openings along a portion of its length. The through openings are configured to receive a key which is selectively inserted for fixing the position of the first end of the cable along the macro-adjustment arm. Preferably, a loop is provided at the second end of the cable that is aligned with the selected through-opening within the macro-adjustment arm for receiving the key.

When the opposing first and second ends of the cable are connected to the respective micro-adjustment and macro-adjustment arms, the tree stand is secured against a tree. The user may then rotate the rotatable sleeve for fine-tuning the length of the micro-adjustment arm. This, in turn, serves to adjust the horizontal position of the tree stand so that the user is balanced.

Preferably, the micro-adjustment arm has a first end connected to the first end of the cable through a fixed sleeve, and a second end pivotally connected to the first side of the frame of the tree stand via a pivoting connector. The pivoting connector permits the micro-adjustment arm to pivot in both a horizontal plane and a vertical plane. Preferably, the macro-adjustment arm is also pivotally connected to the frame to permit rotation of the macro-adjustment arm about two axes.

BRIEF DESCRIPTION OF THE DRAWINGS

So that the manner in which the above recited features of the present invention can be better understood, certain drawings are appended hereto. It is to be noted, however, that the appended drawings illustrate only selected embodiments of the inventions and are therefore not to be considered limiting of scope, for the inventions may admit to other equally effective embodiments and applications.

DETAILED DESCRIPTION

Definitions

As used herein, the term "cable" means any elongated flexible member having opposing first and second ends. One non-limiting example is a steel cable.

Description of Specific Embodiments

Figure 1:
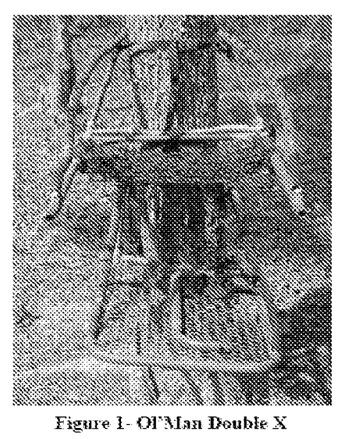
FIG. 1 presents a front view of a tree stand according to the present invention, in one embodiment. The illustrative tree stand is a seating tree stand having a seat. The tree stand is supported against a post or tree trunk by a flexible cable. A pair of opposing adjustment arms is provided for the tree stand. One arm is a micro-adjustment arm, while the other is a macro-adjustment arm.

FIG. 1 presents a front view of a tree stand of the present invention, in one embodiment. The tree stand is generally designated as 100, and is configured to support a user (not shown). The user may be a hunter, a photographer, a naturalist or any other user. The tree stand 100 is affixed to and supported by a representative tree 10. The representative tree 10 may be any tree or post that will safely support the tree stand 100 at an elevated position.

The tree stand 100 of FIG. 1 is a seating tree stand. This means that the tree stand 100 is configured to support the user in a seated position. To accommodate a seated user, the stand 100 includes a seat 112. Preferably, the seat 112 defines a soft fabric material such as a woven mesh. However, other seat arrangements may be used such as a taut polyester tarp or a rigid, contoured plate fabricated from a plastic material. It is understood that the tree stand may be a standing tree stand (such as tree stand 200 of FIG. 5) in which cases the tree stand 200 will support a standing platform (such as platform 212 of FIG. 5) rather than a seat 112.

Figure 2:
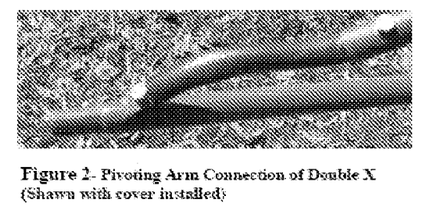
FIG. 2 presents a rear perspective view of the tree stand of FIG. 1. One end of the cable is exploded away from the macro-adjustment arm.

FIG. 2 provides a rear, perspective view of the seating tree stand 100 of FIG. 1. In this view, the tree stand 100 is not attached to the tree 10 so that various components of the stand 100 are more readily seen. For instance, the dimensions of the seat 112 are more visible. Further, an end 54 of a cable 50 is exploded away from macro-adjustment arm 140 for illustration, as will be discussed in greater detail below.

The tree stand 100 also includes a frame 120. The frame 120 is preferably fabricated from hollow aluminum tubes. The tubular frame 120 includes a first side bar 122 and a second opposite side bar 124. In addition, the frame 120 of FIGS. 1 and 2 includes a front bar 126 and a rear bar 128. These four tubes 122, 124, 126, 128 define a plane forming the frame 120. The tubes 122, 124, 126, 128 are preferably welded together for a unitary construction. The hollow aluminum construction makes the tree stand 100 light enough to be transported into a wooded area by the user. The tubes may be painted with a camouflage pattern to aid in concealing the tree stand 100, 200 from animals and to enhance marketability. In one aspect, the individual tubes 122, 124, 126, 128 that make up the frame 120 have a square cross-section for added strength.

In the illustrative tree stand 100, the first 122 and second 124 side tubes support the seat 112. In addition, the side tubes 122, 124 support a micro-adjustment arm 130 and a macro-adjustment arm 140, respectively. Operation of the micro-adjustment arm 130 and the macro-adjustment arm 140 will be discussed further below. Of particular importance, the micro-adjustment arm 130 and the macro-adjustment arm 140 hold a cable 50 in place when the tree stand 100 is secured to the tree 10.

Returning again to the frame 120, the front tube 126 of the frame 120 is positioned in front of a seated user. The front tube 126 is configured to optionally support the knees or legs of the user. Preferably, the front tube 126 is linear and is cushioned, though any arrangement may be provided.

The rear tube 128 of the frame 120 is positioned behind the seat 112. The rear tube 128 supports the frame 120 when the stand 100 (or 200) is positioned against the tree 10. In the embodiment shown in FIGS. 1 and 2, the frame 120 further includes a serrated tree bar 129 having ends connected to the opposing side tubes 122, 124, and having a medial portion welded or otherwise connected to the rear tube 128. The tree bar 129 is concave in shape so as to more securely rest against the tree 10. Further, the tree bar 129 optionally includes teeth 114 (seen in FIG. 2) for biting into the tree 10 for a more secure position.

It is understood that the rear tube 128 may take the shape of the connector bar 129 so as to obviate the need for separate rear 128 and tree bars 129. Alternatively, the rear 128 and tree bars 129 may be integral, meaning that they form a single bar rather than two separate bars welded together.

The tree stand 100 may optionally include a foot rest. A foot rest is shown in FIGS. 1 and 2 at 160. The foot rest 160 also defines a tubular bar having a square cross section. The foot rest 160 is bent downward to accommodate and to receive the feet of the user.

The foot rest 160 has a first end 162 releasably secured to the first side tube 122. The foot rest 160 also has a second end 164 releasably secured to the second side tube 124. In the arrangement of FIGS. 1 and 2, hollow support members 131, 141 are supported by the respective first 122 and second 124 side tubes. The support members 131, 141, in turn, receive and support the foot rest 160. Support may involve placing the hollow members 131, 141 on top of side tubes 122, 124 (as indicated for member 131 in the alternate view of FIG. 4) or, as shown in FIGS. 1, 2 and 3, by securing the side tubes 122, 124 at least partially within and in line with the hollow members 131, 141.

Figures 2, 3:
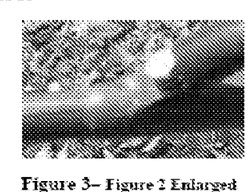
FIG. 3 shows an enlarged perspective view of the micro-adjustment arm of the tree stand of FIGS. 1 and 2.
Figure 3:
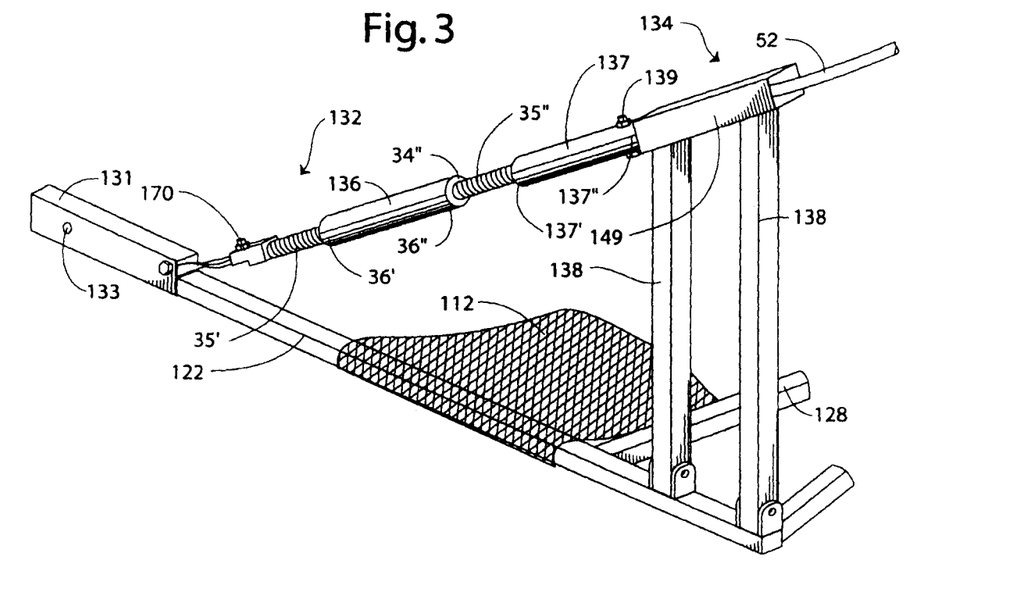

In the arrangement of FIGS. 1, 2 and 3, support member 131 slidingly receives the first end 162 of the foot rest 160; support member 141 slidingly receives the second end 164 of the foot rest 160. The position of the first 162 and second 164 ends of the foot rest 160 are held secure within the support members 131, 141 by bolts 165 which may be tightened down onto the first 162 and second 164 ends of the foot rest 160. Alternatively, or in addition, the first 162 and second 164 ends of the foot rest 160 may include outwardly biased pins (not seen) which are releasably received in holes 133, 143 along the support members 131, 141.

It is noted here that the orientation of the foot rest 160 may be reversed. In this respect, the ends 162, 164 of the foot rest 160 may be removed from the respective support members 131, 141, and the foot rest 160 turned over. Then, the first end 162 is inserted into the support sleeve 141, and the second end 164 is inserted into the support member 131. In this way, the foot rest becomes a support member for stabilizing the barrel of a rifle, or a "gun rest."

As noted, in order for the tree stand 100 to be supported by the tree 10, a rear portion of the frame 120 engages the tree 10. In the arrangement of FIGS. 1 and 2, the rear portion defines the rear tube 128 and tree bar 129, together. To further secure the tree stand 100 to the tree 10, a flexible tensile member such as a steel cable 50 is wrapped around the tree 10. The cable 50 is preferably housed within an elongated, flexible hose to prevent rusting and scarring of the cable 50. The cable 50 defines a calculated length which permits the cable 50 to envelope trees of anticipated diameter, but not over release such that the frame 120 might become too far out of balance.

The cable 50 has a first end 52 operatively connected to the micro-adjustment arm 130, and a second end 54 releasably connected to the macro-adjustment arm 140. The second end 54 of the cable 50 may define a loop. Alternatively, and as shown in the embodiment of FIG. 2, the second end 54 may define a sturdy plastic or metal piece the incorporates a through-opening. The end 54 is configured to be inserted into the hollow macro-adjustment arm 140 when the user has positioned the tree stand 100 at the desired position within the tree 10. The adjustment arm 140 is used to make an initial macro-adjustment before the user places his or her weight on the tree stand 100. For this reason, adjustment arm 140 functions and is referred to herein as a "macro-adjustment arm."

The macro-adjustment arm 140 has a proximal end 142 connected to the support member 141, and a distal end 144 that is releasably connected to the second end 54 of the cable 50. The proximal end 142 of the macro-adjustment arm 140 defines a flexible element such as a rubber-coated cable. The cable 142 is secured to the support member 141 by a bolt 143. The flexible nature of the cable 142 enables the macro-adjustment arm 140 to pivot both vertically and horizontally relative to the second side tube 124.

The macro-adjustment arm 140 also includes a lightweight metal (or other material) tube 146. The tube 146 may be of circular, square, rectangular or other polygonal profile, but is in any instance configured to receive the second end 54 of the cable 50. The tube 146 includes a plurality of through holes 145 dimensioned to receive a key 147. Thus, when the loop 54 of the cable 50 is inserted into the tube 146, the loop 54 is aligned with a desired through opening 145, and the key 147 is then inserted into a through hole 145 and the loop 54. Preferably, each through hole defines a pair of openings on top and bottom surfaces of the tube 146 which together receive the key 147.

It is again noted that the end 54 of the cable 50 is not limited to a simple loop configuration; the end 54 could be a square swaged end or bracket configuration which allows the cable end 54 to more readily align with the key 147. Indeed, the end 54 of the cable 50 shown is FIG. 2 defines a squared attachment member having a through-opening as a key hole.

In operation, the second end 54 of the cable 50 is manipulated within the elongated tube 146 of the macro-adjustment arm 140. Once the end 54 of the cable 50 is properly positioned along the length of the tube 146 to bring the cable 50 taut, the user will insert the key 147 through an aligned through hole 145 and the aligned through-opening 54 of the cable 50. In this way, the position of the cable 50 relative to the macro-adjustment arm 140 is fixed. This step is made by the user prior to the user placing his or her full weight on the tree stand 100.

The distal end 144 of the macro-adjustment arm 140 is preferably supported by at least one support bar 148. A lower end of the support bar 148 is pivotally connected to the second side tube 124, while an upper end of the support bar 148 is connected to the second end 144 of the macro-adjustment arm 140. The pivoting connection of the support bar 148 to the frame member 124 allows the macro-adjustment arm 140 to be folded inwardly when the user desires to transport the tree stand 100. In addition, the pivoting connection allows the macro-adjustment arm 140 to fold outwardly so as to accommodate different tree diameter sizes and the girths of different users. To further accommodate the girth of a user, the support tube 146 preferably has a radial or arcuate shape.

Turning now to the micro-adjustment arm 130, the micro-adjustment arm 130 also has a proximal end 132 and a distal end 134. FIG. 3 shows an enlarged perspective view of the proximal end 132 of the micro-adjustment arm 130 of FIGS. 1 and 2. Unique features of the micro-adjustment arm 130 are more clearly seen. It can be seen that the proximal end 132 of the micro-adjustment arm 130 is connected to the support member 131, while the distal end 134 is connected to the first end 52 of the cable 50.

Figure 4:
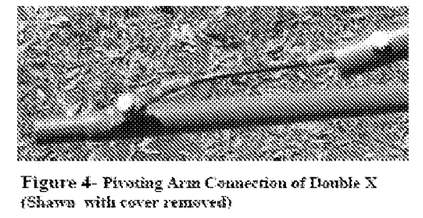
FIG. 4 presents an enlarged view of the micro-adjustment arm of the tree stand of FIGS. 1 and 2, and shows a pivoting connector for connecting the first frame of the tree stand to the micro-adjustment arm. The arrangement of FIG. 4 is actually an alternate arrangement, showing a different means for supporting a hollow side support member.

The connection between the proximal end 132 of the micro-adjustment arm 130 and the support member 131 is provided by a pivoting connector 170. FIG. 4 presents an enlarged perspective view of the micro-adjustment arm 130, including the pivoting connector 170. In the arrangement of FIGS. 3 and 4, the pivoting connector 170 includes a half-twist bracket 172. The bracket 172 is connected to the micro-adjustment arm 130 at one end by a vertical bolt 171'. At its opposite end, the bracket 172 is connected to the support member 131 by a horizontal bolt 171". Each bolt 171', 171" is secured to the bracket 172 by means of a nut. The bolts 171', 171" permit the bracket 172 to pivot simultaneously in both a horizontal plane and a vertical plane. Stated another way, the bracket 172 may pivot about two axes. Nylon washers (not shown) may be used to facilitate rotation of the bracket 170 relative to the frame 120 and rotation of the arm 130 relative to the bracket 170. Alternatively, bushings (not shown) may be employed.

Other arrangements for a pivoting connection may be provided. For instance, the pivoting connector may be a tubular body having transverse openings at opposing ends. The connector would also be configured to permit the micro-adjustment arm 130 to move in two planes.

The micro-adjustment arm 130 also comprises a rotatable sleeve 136. The sleeve 136 is sized to permit manual manipulation by the user. Preferably the diameter of the rotatable sleeve 136 is configured to provide a more ergonomic fit for the user's hand and to permit accelerated rotation. In one aspect, a central portion of the sleeve 136 is sized or built up to a diameter of about 3 inches to 5 inches, tapering down to about 1 inch to 2 inches at the opposing ends. Preferably a tacky or cushioned material is supplied as an outer surface. Alternatively, the outer diameter of the sleeve 136 may be configured to have recesses to accommodate the fingers of the user. The rotatable sleeve 136 permits the user to adjust the tension in the cable 50 while the weight of the user is supported by the tree stand 100. This means that the user may safely level the seat 112 relative to the tree 10 while the user remains seated. The rotatable sleeve 136 defines a tubular body having opposing ends 34', 34". Each end is sized and configured to receive a threaded rod. In the arrangement of FIGS. 1 and 2, a proximal end 36' of the rotatable sleeve 136 receives a fixed threaded rod 35', while a distal end 36" of the rotatable sleeve 136 receives a rotating threaded rod 35".

The fixed threaded rod 35' is welded or otherwise attached at one end to the pivoting connector 170, and is received at the opposite end within a nut member (not indicated) at the proximal end 36' of the rotatable sleeve 136. Preferably the threads on the fixed threaded rod 35' are acme threads for ease of manipulation of the rotatable sleeve 136. Rotation of the sleeve 136 by the user will cause the threaded rod 35' to be drawn into or out of the rotatable sleeve 136, depending on direction of rotation. The result is that rotation of the rotatable sleeve 136 causes a "push-pull" action along the micro-adjustment arm 130. Thus, the rotatable sleeve 136 may be a "push-pull sleeve."

As noted above, the micro-adjustment arm 130 includes a second threaded rod—a rotating threaded rod 35". The rotating threaded rod 35" is welded or otherwise attached at one end to the distal end 35" of the rotatable sleeve 136. At its other end, the rotating threaded rod 35" rotates within a threaded nut member 34". The nut member 34" is sized to receive the rotating threaded rod 35". Preferably the threads on rod 35" are also acme threads for ease of manipulation of the rotatable sleeve 136. Rotation of sleeve 136 by the user will cause the nut member 34" to turn the rotating threaded rod 35".

The micro-adjustment arm 130 also includes a fixed sleeve 137. The fixed sleeve 137 has proximal 137' and distal 137" ends. At its proximal end 137', the fixed sleeve 137 receives an end of the rotating threaded rod 35". A nut member resides at the proximal end 137' of the fixed sleeve 137. When the rotatable sleeve 136 and connected rotating threaded rod 35" are turned, the rotatable sleeve 136 and connected rotating threaded rod 35" are either drawn in or pushed away from the fixed sleeve 137. In this way, additional "push-pull" action is provided for increasing or reducing the tension in the cable 50.

At its distal end 137", the fixed sleeve 137 receives the flexible tensile member, such as a cable 50. In the embodiment shown in FIGS. 1 and 2, the flexible cable 50 is secured to the fixed sleeve 137 by a bolt connector 139 (seen best in FIG. 3).

It is understood that other arrangements of a micro-adjustment arm for moving a tensile member may be provided. For example, the rotatable sleeve 136 could function as a turnbuckle, meaning that neither rod 35' nor rod 35" rotates. In a turnbuckle arrangement, the sleeve 136 draws in or lets out the rods 35', 35" simultaneously. However, the external appearance of the sleeve 136 need not change and, therefore, sleeve 136 of FIGS. 1 and 2 may be representative of either a push-pull sleeve or a turnbuckle.

Finally, the distal end 35" of the micro-adjustment arm 130 is supported by at least one anti-torque bar 138. In the arrangement of FIGS. 1 and 2, a pair of anti-torque bars 138 is provided to further limit torquing of the cable 50. A lower end of each of the anti-torque bars 138 is pivotally connected to the first side tube 122, while an upper end of each of the anti-torque bars 138 is connected to a transverse support bar 149. The anti-torque bars 138 allow the micro-adjustment arm 130 to be folded over when the user desires to transport the tree stand 100. Further, the anti-torque bars 138 provide support for the micro-adjustment arm 140 during use. Further still, the anti-torque bars 138 permits the arm 130 to accommodate trees 10 of varying diameters and users of different girths.

It is noted that the transverse support bar 149 has an optional radial or arcuate shape. This allows the micro-adjustment arm 130 to further accommodate the girth of a user.

Finally, it is noted from FIGS. 3 and 4 that the fixed sleeve 137 also serves as a positive stop. When a user begins to turn the sleeve 136 in order to length the cable 50, the distal end 137" of the fixed sleeve 137 will ultimately engage the transverse support bar 149. This, in turn, restricts the length in which the first end 52 of the cable 50 can be let out. The positive stop feature prevents the cable end 52 from being disconnected from the micro-adjustment arm 130. Other arrangements for a positive stop may be employed. For instance, the bolt connector 139 could be positioned and arranged to encounter the transverse support bar 149.

Figures 4, 5:
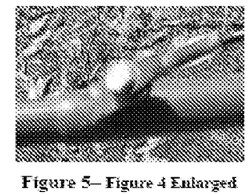
FIG. 5 presents two tree stands in different embodiments. One tree stand is the seating tree stand of FIGS. 1 and 2 which permits the user to sit; while the other is a standing tree stand which supports the user in a standing position.
Figure 5:
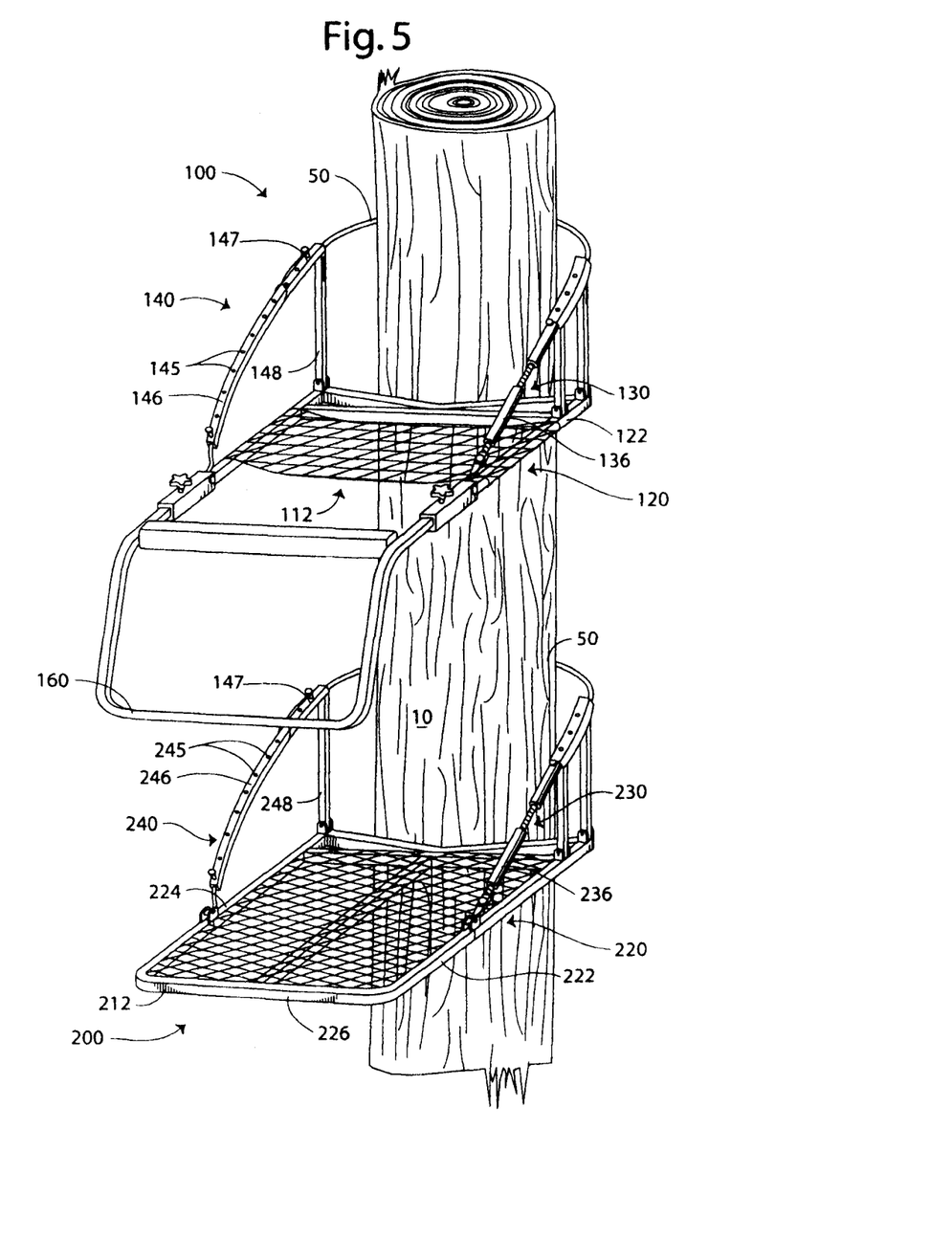

Turning now to FIG. 5, a pair of tree stands 100, 200 is shown. Each stand 100, 200 is affixed to the tree 10. As noted above, stand 100 is a seating tree stand, while stand 200 is a standing tree stand. Each stand 100, 200 includes a frame 120, 220 along with a respective macro-adjustment arm 140, 240 and a respective micro-adjustment arm 130, 230. Each macro-adjustment arm 140, 240 includes a plurality of through-openings 145, 245 for receiving a flexible tensile member 50. In addition, each macro-adjustment arm 140, 240 has a key 147, or pin, for securing a looped end of the cable 50 through selected and aligned through-openings 145, 245.

Figure 6:
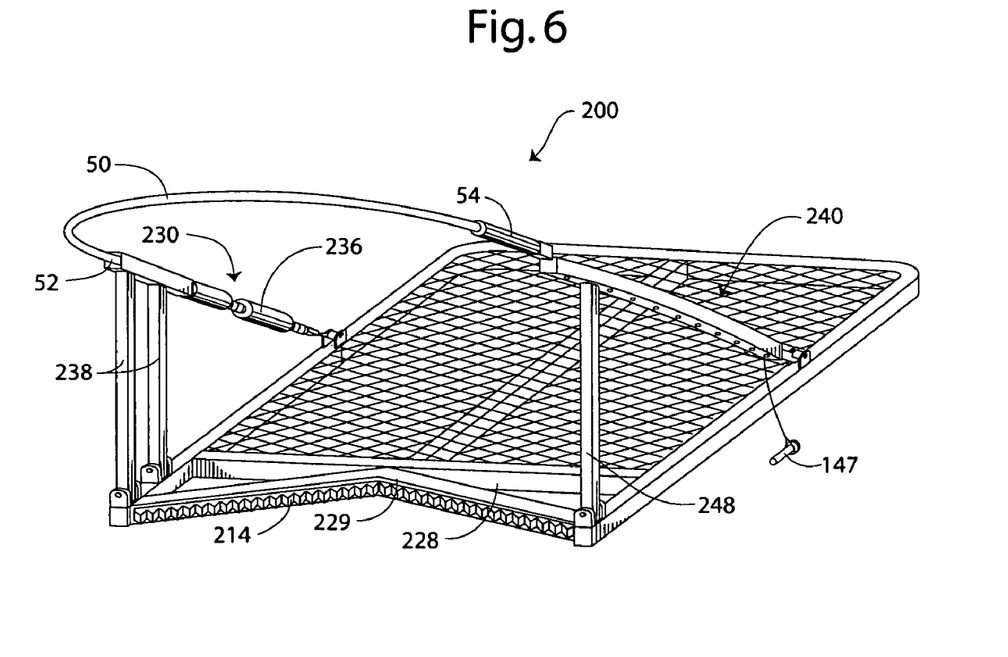
FIG. 6 presents a rear perspective view of the standing tree stand of FIG. 5. One end of the cable is exploded away from the macro-adjustment arm.

FIG. 6 presents a rear perspective view of the standing tree stand of FIG. 5. One end 54 of the cable 50 is exploded away from the macro-adjustment arm 240, that is, it is not inserted into the tubular member 246. The features and operation of standing tree stand 200 are the same as the features for seating tree stand 100, except for the use of a standing platform 212 in lieu of a seat 112. Also, the standing tree stand 200 does not need a foot rest 160. It is also noted that the 200 series is generally used to denote parts of the standing tree stand 200. Therefore, it is not necessary to repeat the description of these parts herein. However, it is again noted that the standing tree stand 200 also includes the rotatable sleeve mechanism 236 in a micro adjustment arm 230.

It is noted that in the standing tree stand 200 of FIG. 5, a single support bar 248 is used for supporting the macro-adjustment arm 240. However, a pair of support bars 248 might be employed as with the anti-torque bars 138. This would provide additional support for the macro-adjustment arm 240 and also help prevent torquing. However, the single support bar model of FIG. 5 is preferred due to considerations of cost and complexity of manufacture.

As can be seen, an improved tree stand 100, 200 has been offered. It is to be understood that the embodiments shown in the above-described Figures are illustrative, and should not be considered limiting of the scope of the claims, which follow.

We claim:

1. A tree stand comprising:
a frame having opposing first and second opposite sides;
a flexible cable dimensioned to be wrapped around a tree, and having first and second ends;
a micro-adjustment arm comprising a proximal end pivotally supported on the first side of the frame, and a distal end supported above the first side of the frame by at least one anti-torque bar that pivots inwardly, the micro-adjustment arm being secured to the first end of the cable, and the micro-adjustment arm comprising a rotatable sleeve for fine-tuning the tension in the cable so that the position of the tree stand relative to the tree may be adjusted while the tree stand supports the weight of the user in such a manner that the first and second sides of the frame move together to assist in tree stand leveling;
a macro-adjustment arm comprising a proximal end pivotally supported on the second side of the frame, and a distal end supported above the second side of the frame by at least one support bar that also pivots inwardly, the macro-adjustment arm being releasably connectable at selected points along its length to the second end of the cable, the proximal end of the micro-adjustment arm is supported on the first side of the frame by a pivoting connector; and the at least one anti-torque bar on the first side of the frame pivots relative to the first side of the frame, the distal end of the micro-adjustment arm comprises a tubular body slidably receiving the cable, wherein the micro-adjustment arm further comprises a first threaded rod having first and second opposite ends, wherein the first end of the first threaded rod is connected to the pivoting connector, and the second end of the first threaded rod is connected to the rotatable sleeve at a first end of the rotatable sleeve; and a second threaded rod having first and second opposite ends, wherein the first end of the second threaded rod is operatively connected to a second end of the rotatable sleeve, and the second end of the second threaded rod is connected to a first end of a fixed sleeve and the cable is secured to a second end of the fixed sleeve, the fixed sleeve serving as a positive stop to limit extension of the cable by abutting the tubular body.

2. The tree stand of claim 1, wherein:
the frame further comprises a platform supported by the first and second sides of the frame on which a user may stand.

3. The tree stand of claim 1, wherein:
the frame further comprises a seat supported by the first and second sides of the frame on which a user may sit.

4. The tree stand of claim 1, wherein the pivoting connector comprises a half-twist bracket which permits the micro-adjustment arm to pivot in both a horizontal plane and a vertical plane.

5. The tree stand of claim 1, wherein the tubular body being arcuate to accommodate the girth of a user.

6. The tree stand of claim 1, wherein the rotatable sleeve is a rota-sleeve which selectively pulls in or pushes back the first end of the cable when the rotatable sleeve is rotated in a selected direction.

7. The tree stand of claim 1, wherein the rotatable sleeve is a turnbuckle which selectively draws in or lets out the first and second threaded rods when the rotatable sleeve is rotated in a selected direction.

8. The tree stand of claim 1, wherein the macro-adjustment arm comprises:
an elongated tubular body for receiving the second end of the cable, the tubular body having a plurality of through openings along a portion of its length through which a key may be selectively inserted for fixing the position of the second end of the cable along the macro-adjustment arm.

9. The tree stand of claim 1, wherein the rotatable sleeve has an outer diameter, and at least a portion of the outer diameter exceeds two inches.

10. The tree stand of claim 1, wherein the rotatable sleeve has an outer diameter that is contoured to accommodate the shape of a user's hand, and at least a portion of the outer diameter exceeds 2 inches.

11. The tree stand of claim 1, wherein the macro-adjustment arm comprises a tubular body, the tubular body being arcuate to accommodate the girth of a user.

* * * * *

UNITED STATES PATENT AND TRADEMARK OFFICE
CERTIFICATE OF CORRECTION

PATENT NO. : 7,802,653 B2
APPLICATION NO. : 11/332129
DATED : September 28, 2010
INVENTOR(S) : John M. Louk et al.

It is certified that error appears in the above-identified patent and that said Letters Patent is hereby corrected as shown below:

The title page should be deleted to appear as per attached title page.

The sheets of drawing consisting of figures 1 through 5 should be deleted to appear as per attached figures 1 through 5.

Delete the text in claim 1 from column 9, line 38 through column 10, line 5, and substitute the following:

wherein:
    the micro-adjustment arm further comprises:
        a first threaded rod having first and second opposite ends, with the first end of the first threaded rod being connected to the pivoting connector, and the second end of the first threaded rod being connected to the rotatable sleeve at a first end of the rotatable sleeve; and
        a second threaded rod having first and second opposite ends, wherein the first end of the second threaded rod is operatively connected to a second end of the rotatable sleeve, and the second end of the second threaded rod is connected to a fixed sleeve; and
        the cable is secured to a second end of the fixed sleeve, the fixed sleeve serving as a positive stop to limit extension of the cable by abutting the tubular body.

Signed and Sealed this
Seventeenth Day of July, 2012

David J. Kappos
*Director of the United States Patent and Trademark Office*

(12) United States Patent
Louk et al.

(10) Patent No.: US 7,802,653 B2
(45) Date of Patent: Sep. 28, 2010

(54) ADJUSTABLE TREE STAND

(76) Inventors: John M. Louk, 551 Macedonia Rd., Petal, MS (US) 39465; Ronald L. Berkbuegler, 8767 Old Lebanon/Troy Rd., Troy, IL (US) 62294

(*) Notice: Subject to any disclaimer, the term of this patent is extended or adjusted under 35 U.S.C. 154(b) by 1070 days.

(21) Appl. No.: 11/332,129

(22) Filed: Jan. 13, 2006

(65) Prior Publication Data
US 2006/0169538 A1 Aug. 3, 2006

Related U.S. Application Data

(60) Provisional application No. 60/643,880, filed on Jan. 14, 2005.

(51) Int. Cl.
*E04G 3/00* (2006.01)
(52) U.S. Cl. .................................. 182/135; 182/187
(58) Field of Classification Search .................. 182/135, 182/136, 187, 188
See application file for complete search history.

(56) References Cited

U.S. PATENT DOCUMENTS

| | | | |
|---|---|---|---|
| 1,176,225 A | 3/1916 | Lloyd | |
| 3,067,975 A | 12/1962 | Wilcox | |
| 3,268,196 A * | 8/1966 | Anton, Sr. | 182/107 |
| 3,485,320 A | 12/1969 | Jones | |
| 3,817,350 A | 6/1974 | Gray | |
| 3,885,649 A | 5/1975 | Damron | |
| 4,022,292 A | 5/1977 | Van Gompel | |
| 4,137,995 A | 2/1979 | Fonte | |
| 4,230,203 A | 10/1980 | Sweat et al. | |
| 4,230,296 A | 10/1980 | Staley et al. | |
| 4,244,445 A * | 1/1981 | Strode | 182/136 |
| 4,316,526 A | 2/1982 | Amacker | |
| 4,321,982 A | 3/1982 | Strickland | |
| 4,331,216 A | 5/1982 | Amacker | |
| 4,347,690 A * | 9/1982 | Wallace, Jr. | 52/93.1 |
| 4,417,645 A | 11/1983 | Lntz | |

(Continued)

FOREIGN PATENT DOCUMENTS

CA 1140447 2/1983

(Continued)

OTHER PUBLICATIONS

Innovative Treestand Systems, Inc. pamphlet.

(Continued)

*Primary Examiner*—Alvin C Chin-Shue
(74) *Attorney, Agent, or Firm*—Peter L. Brewer; Baker, Donelson, Bearman, Caldwell & Berkowitz, PC (57) ABSTRACT

A tree stand is provided, having a frame. The tree stand may be a standing tree stand in which case the frame includes a platform on which a user may stand; alternatively, the tree stand may be a seating tree stand in which case the frame includes a seat on which a user may sit. The tree stand includes a cable dimensioned to be wrapped around a tree. The tree stand is configured so that tension in the cable may be adjusted while the tree stand supports the weight of the user. In one aspect, the tree stand employs a rotatable sleeve in one arm for adjusting the length of the cable by adjusting the tension in the cable.

11 Claims 4 Drawings Sheets